(12) United States Patent
Yang et al.

(10) Patent No.: US 9,684,620 B2
(45) Date of Patent: Jun. 20, 2017

(54) SIGNAL ADAPTOR, SIGNAL RECEIVING CIRCUIT AND ASSOCIATED METHODS

(71) Applicant: Realtek Semiconductor Corp., HsinChu (TW)

(72) Inventors: Chih-Yuan Yang, New Taipei (TW); Shin-Yu Lin, Hsinchu (TW); Tzuo-Bo Lin, Taipei (TW); Chien-Hsun Lu, Chiayi (TW)

(73) Assignee: Realtek Semiconductor Corp., HsinChu (TW)

( * ) Notice: Subject to any disclaimer, the term of this patent is extended or adjusted under 35 U.S.C. 154(b) by 415 days.

(21) Appl. No.: 14/468,351

(22) Filed: Aug. 26, 2014

(65) Prior Publication Data

US 2015/0067227 A1 Mar. 5, 2015

(30) Foreign Application Priority Data

Aug. 27, 2013 (TW) .............. 102130652 A

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01)

(58) Field of Classification Search
CPC .................. G06F 13/4027; G06F 13/4282
See application file for complete search history.

(56) References Cited

U.S. PATENT DOCUMENTS

| 8,019,906 B2* | 9/2011 | Lee | G09G 5/006 348/723 |
| 2011/0063501 A1* | 3/2011 | Bar-Niv | G09G 5/006 348/474 |
| 2011/0141351 A1* | 6/2011 | Yan | G09G 5/006 348/445 |
| 2013/0260828 A1* | 10/2013 | Kim | G06F 1/1632 455/557 |
| 2015/0012682 A1* | 1/2015 | Yang | G09G 5/006 710/316 |
| 2015/0143006 A1* | 5/2015 | Chen | G06F 13/4022 710/106 |

FOREIGN PATENT DOCUMENTS

CN 101727873 A 6/2010

OTHER PUBLICATIONS

"VESA DisplayPort Interoperability Guideline", Version 1.1, Video Electronics Standards Association, http://hackipedia.org/Hardware/video/connectors/DisplayPort/VESA%20DisplayPort%20Interoperability%20Guideline%20v1.1.pdf, p. 1, 17, 20 and 31, Jan. 28, 2008.

* cited by examiner

*Primary Examiner* — Nimesh G Patel
(74) *Attorney, Agent, or Firm* — Winston Hsu

(57) ABSTRACT

A signal relaying circuit includes an input interface arranged for receiving an input signal; a DisplayPort (DP) output interface arranged for outputting a DP-like signal, where the input interface and the DP output interface correspond to different interface standards; and a relaying circuit coupled between the input interface and the DP output interface, arranged for relaying the input signal to the DP output interface according to the characteristics of channels, so as to generate the DP-like signal. A signal receiving circuit, signal relaying method and signal receiving method are also disclosed.

15 Claims, 8 Drawing Sheets

SIGNAL ADAPTOR, SIGNAL RECEIVING CIRCUIT AND ASSOCIATED METHODS

BACKGROUND OF THE INVENTION

1. Field of the Invention

The disclosed embodiments of the present invention relate to signal adaptation, and more particularly, to a signal adaptor and a signal receiving circuit for relaying a signal to a DisplayPort (DP), and associated signal adapting and receiving methods.

2. Description of the Prior Art

Modern interfaces of display monitors comply with the following standards: video graphics array (VGA), high-definition multimedia interface (HDMI), DisplayPort (DP) and mobile high definition link (MHL). If a single display apparatus needs to support multiple display interface standards, a dedicated connection interface/socket must be implemented for each individual interface specification. For example, a VGA socket, a DP socket, an HDMI socket and an MHL socket may all be present in a display apparatus, which is not only inconvenient to users, but also uneconomical in manufacturing terms.

SUMMARY OF THE INVENTION

One of the objectives of the present invention is therefore to provide a signal adaptor and a signal receiving circuit, and associated signal adapting and receiving methods, for receiving MHL signals in a DP dual mode, which enables signals of the DP format, the HDMI format, and the MHL to be received via a DP connector.

According to a first aspect of the present invention, a signal adaptor is disclosed. The signal adaptor comprises an input interface, a DisplayPort (DP) output interface and a relaying circuit. The input interface is arranged to receive an input signal. The DP output interface is arranged to output a DP-like signal. The relaying circuit is coupled between the input interface and the DP output interface, and arranged to relay the input signal received by the input interface to the DP output interface according to characteristics of channels, so as to generate the DP-like signal. The input interface and the DP output interface correspond to different respective interface standards.

According to a second aspect of the present invention, a signal receiving circuit is disclosed. The signal receiving circuit comprises a DisplayPort (DP) connector, a controller and a switching circuit. The DP connector is arranged to receive a first input signal or a second input signal, and generate a digital input signal accordingly. The controller is coupled to the DP connector, and arranged to detect the digital input signal to generate a control signal. The switching circuit is arranged to select a first connection configuration or a second connection configuration to act as a target connection configuration according to the control signal, and pass the digital output signal via the target connection configuration to produce an output signal. The first input signal complies with the DP format, and the second input signal is a DP-like signal generated by relaying an initial input signal complying with the HDMI specification or the MHL standard.

According to a third aspect of the present invention, a signal adapting method is disclosed. The signal adapting method comprises: receiving an input signal; relaying the received input signal to a DP output interface according to characteristics of channels; and outputting a DP-like signal by the DP output interface; wherein the input interface and the DP output interface correspond to different respective interface standards.

According to a fourth aspect of the present invention, a signal receiving method is disclosed. The signal receiving method comprises: receiving a first input signal or a second input signal, and generating a digital input signal accordingly; detecting the digital input signal to generate a control signal; and selecting a first connection configuration or a second connection configuration to act as a target connection configuration according to the control signal, and passing the digital output signal via the target connection configuration to produce an output signal; wherein the first input signal complies with the DP format, and the second input signal is a DP-like signal generated by relaying an initial input signal which complies with the HDMI specification or the MHL standard.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is coupled to another device, that connection may be through a direct electrical connection, or through an indirect electrical connection via other devices and connections.

Figure 1:
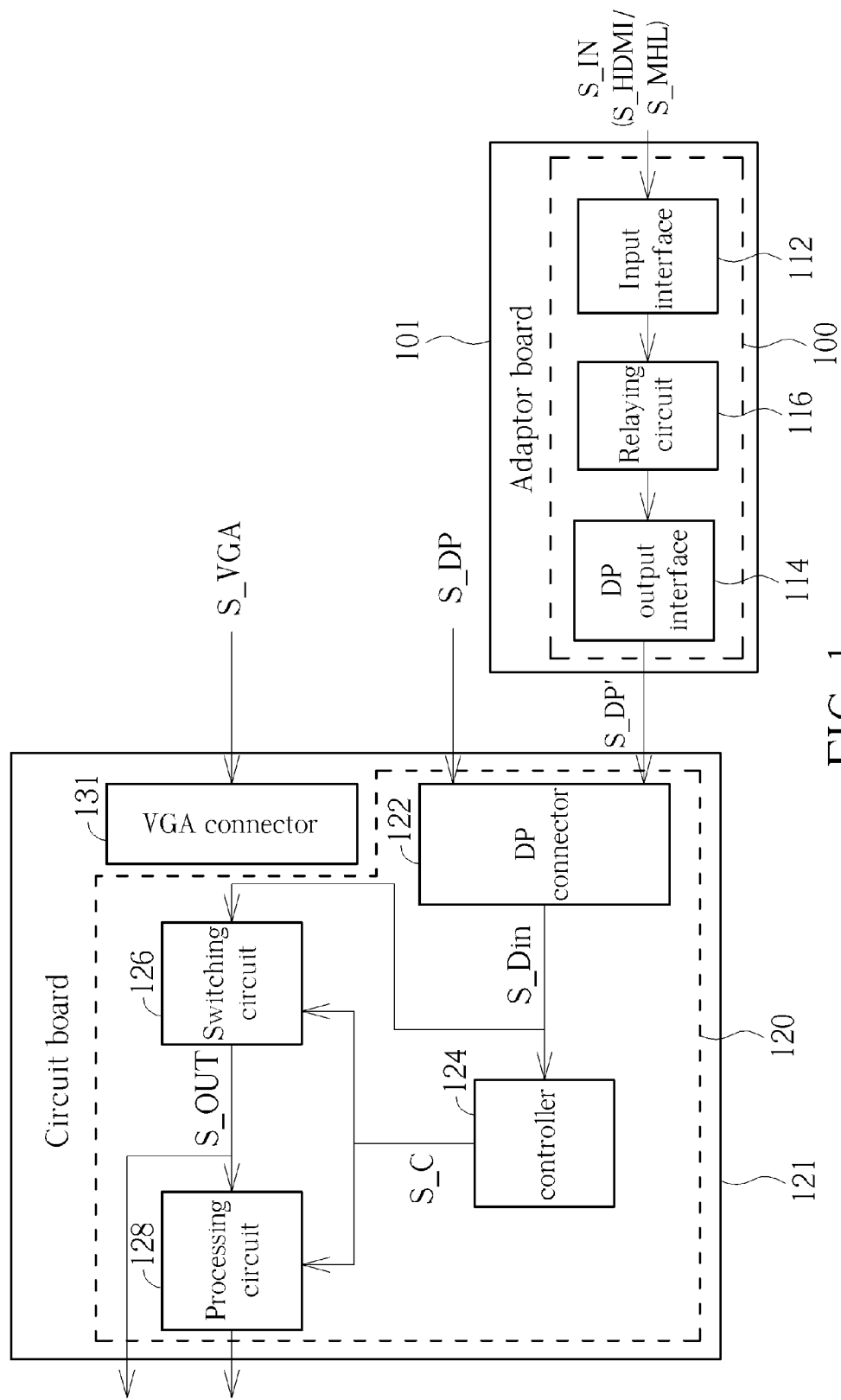
FIG. 1 is a diagram illustrating a signal adaptor and a signal receiving circuit according to an embodiment of the present invention.

FIG. 1 is a diagram illustrating a signal adaptor and a signal receiving circuit according to an embodiment of the present invention. A signal adaptor 100 is disposed on an adaptor board 101, and a signal receiving circuit 120 is disposed on another circuit board 121. In other embodiments, each functional block may be reallocated or functional blocks may be merged according to design requirements. The signal adaptor 100 includes an input interface 112, a DisplayPort (DP) output interface 114 and a relaying circuit 116. The input interface 112 is arranged to receive an input signal S_IN. In this embodiment, the input signal S_IN may be a high-definition multimedia interface (HDMI) signal S_HDMI, or a mobile high definition link (MHL) signal S_MHL. As the MHL standard is based on the HDMI specification, signals which comply with the MHL standard also substantially comply with the HDMI specification. As a result, the input interface 112 receives the signal S_HDMI and the signal S_MHL as illustrated in this embodiment, relays the signal S_HDMI and the signal S_NHL, and outputs results via the DP dual mode interface.

The relaying circuit 116 is coupled between the input interface 112 and the DP output interface 114, and is arranged to relay the input signal S_IN (S_HDMI/S_MHL), received by the input interface 112, and output a DP-like signal S_DP' by the DP output interface 114, thus achieving signal transmission between different interface specifications. With respect to the signal receiving circuit 120, it is determined in real-time whether to switch to the signal adaptor 100 for receiving the DP-like signal S_DP' according to the format of the input plug. For example, when the input plug is determined to be a DP plug, an input signal S_DP will be arranged to bypass the adaptor board 101 and fed to the signal receiving circuit 120; when the input plug is determined to be an HDMI/MHL plug, the input signal S_HDMI/S_MHL will be passed to the signal receiving circuit 120 via the adaptor board 101. The above determination may be achieved by distinguishing the differences between plugs with different specifications, and then relaying input signals via different paths to accomplish a design of passing/bypassing the adaptor board 101. The path switching may be implemented by mechanical means or switch elements in a circuit layout.

The signal receiving circuit 120 includes a DP connector 122, a controller 124, a switching circuit 126 and a processing circuit 128. As mentioned above, the DP connector 122 is capable of selectively switching to the adaptor board 101 to receive the DP-like signal S_DP' or receiving the input signal S_DP directly according to current input signals, and outputting a digital input signal S_Din. When the DP connector 122 receives the DP-like signal S_DP' through the adaptor board 101, the signal receiving circuit 120 will perform an extra process with respect to the DP-like signal S_DP', as the DP-like signal S_DP' does not have the exact format as the standard DP format. The circuit board 121 may further possess a VGA connector 131 for supporting an analogous VGA signal S_VGA. Since receiving and processing the VGA signal is not the focus of the invention, details regarding connections with the signal receiving circuit 120 are omitted here and are not illustrated in FIG. 1 for brevity.

The controller 124 is coupled between the DP connector 122 and the processing circuit 128, and configures the control signal S_C according to a voltage level corresponding to a specific pin of the digital input signal S_Din, so as to control the switching circuit 126 to employ the first connection configuration corresponding to the HDMI specification or the second connection configuration corresponding to the MHL standard to be the target connection configuration. The switching circuit 126 is coupled to the DP connector 122, the controller 124 and the processing circuit 128, respectively. In this embodiment, the switching circuit 126 supports multiple connection configurations, and selectively outputs one of the connection configurations as a target connection configuration to the processing circuit 128 according to the control signal S_C. In particular, the connection configurations supported by the switching circuit 126 may include a first connection configurations corresponding to the HDMI specification and a second connection configurations corresponding to the MHL standard.

The processing circuit 128 processes an output signal S_OUT according to the control signal S_C, wherein when the target connection configuration is the first connection configuration (the HDMI interface), the processing circuit 128 regards a signal of the output signal S_OUT corresponding to a DP pin of the DP port as an HDMI hot plug detect (HDP) signal according to the control signal S_C; and when the target connection configuration is the second connection configuration (the MHL interface), the processing circuit 128 regards the signal of the output signal S_OUT corresponding to the DP pin of the DP port as an MHL control bus (CBUS) signal according to the control signal S_C.

Figure 2:
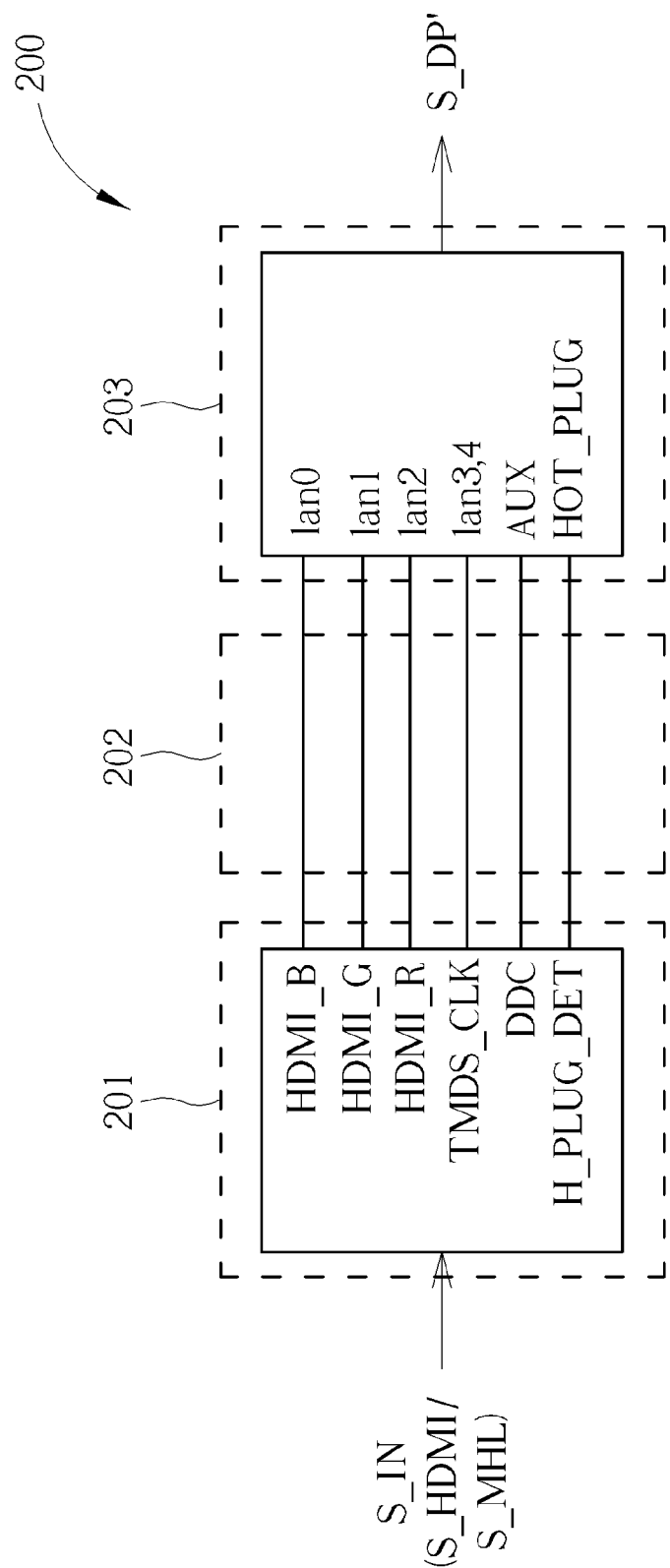
FIG. 2 is a diagram illustrating a signal adaptor according to an embodiment of the present invention.

FIG. 2 is a diagram illustrating a signal adaptor according to an embodiment of the present invention. The signal adaptor 200 includes an input interface 201, a relaying circuit 202 and a DP output interface 203. The input signal S_IN may be an HDMI/MHL signal, and the relaying circuit 202 relays signals of each channel of the input signal S_IN to the corresponding channel complying with the DP specification, for producing the DP-like signal S_DP' which are similar to the DP signal. The DP-like signal S_DP' is then provided to the DP connector 122, via the DP output interface 203, to be the digital input signal S_Din. In a case where the input signal S_Din is the signal S_HDMI which complies with the HDMI specification, the relaying circuit 202 makes signals of the data channels of HDMI_B, HDMI_G, and HDMI_R and a signal of the clock channel TMDS_CLK correspond to lan0-lan4 of the DP signal; where the display data channel (DDC) and the hot plug detect signal H_PLUG_DET of the HDMI signal correspond to the AUX channel and the signal HOT_PLUG of the DP signal. Based on the concept, channels of the HDMI signal can be almost perfectly mapped, such that the signal adaptor 200 can relay the standard HDMI signal to the DP-like signal S_DP'. Please note that FIG. 2 only illustrates part of the channels of the HDMI signal. Each of the remaining channels of the HDMI signal can also be found to have their own correspondence, thereby accomplishing the objectives of the embodiment. Moreover, as mentioned above, the MHL signal complies with the HDMI specification, so the signal adaptor 200 can also relay the MHL signal to the DP signal by using a similar architecture. The input interface 201 receives the input signal S_IN (S_HDMI or S_MHL) and relays it to the corresponding channels by the relaying circuit 202 as shown in FIG. 1, and then outputs the DP-like signal S_DP' via the DP output interface 203.

Figure 3:
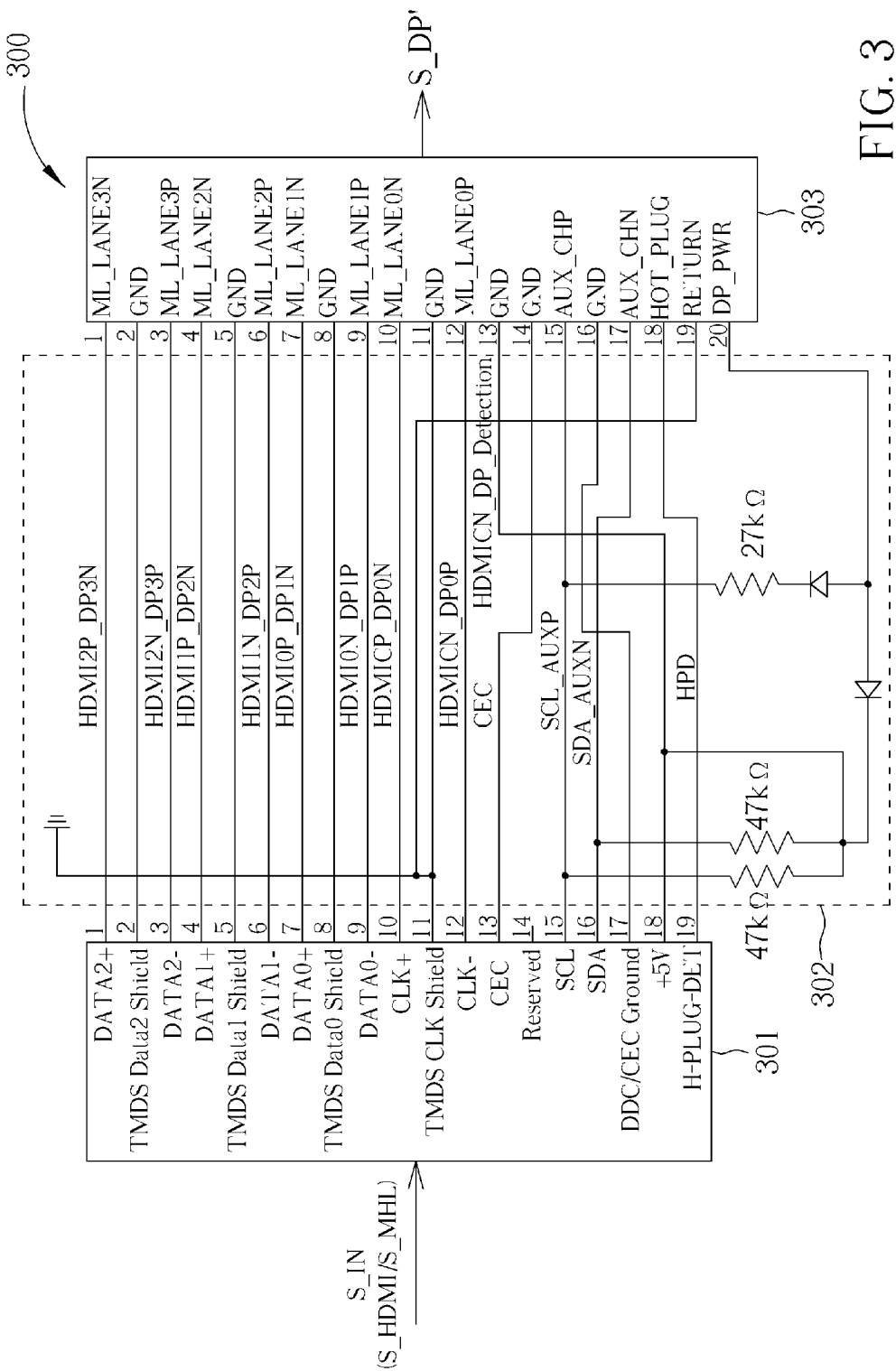
FIG. 3 is a circuit diagram illustrating the signal adaptor of FIG. 2 according to an embodiment of the present invention.

FIG. 3 is a circuit diagram illustrating the signal adaptor of FIG. 2 according to an embodiment of the present invention. A signal adaptor 300 is a circuit diagram of the signal adaptor 200. An input interface 301, a relaying circuit 302 and a DP output interface 303 of the signal adaptor 300 correspond to the input interface 201, the relaying circuit 202 and the DP output interface 203 of the signal adaptor 200, respectively. In FIG. 3, 19 HDMI pins of the input signal S_IN (S_HDMI/S_MHL) are fully mapped to 20 pins complying with the DP format, and output a DP-like signal S_DP'. Please note this is for illustrative purposes only.

Figure 4:
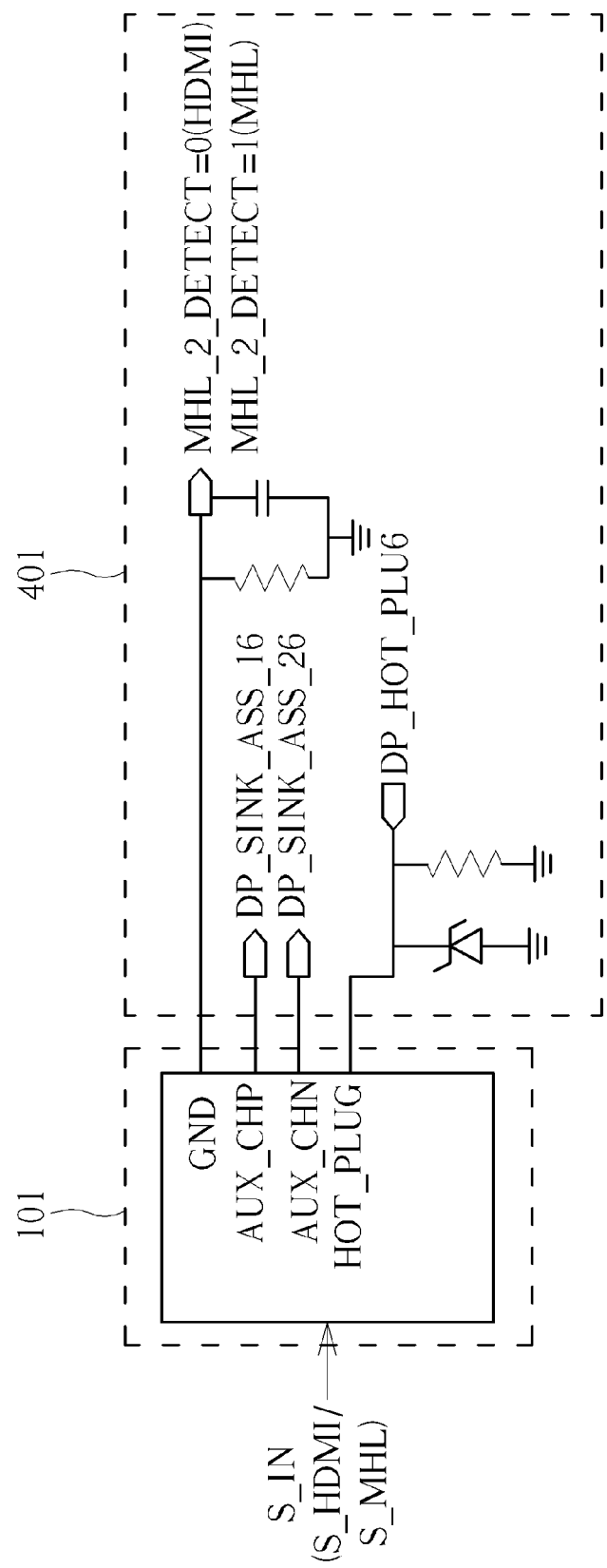
FIG. 4 is a circuit diagram illustrating the DP connector of the signal receiving circuit according to an embodiment of the present invention.

FIG. 4 is a circuit diagram illustrating the DP connector of the signal receiving circuit according to an embodiment of the present invention. ADP connector 401 receives the DP-like signal S_DP', which includes DP_SINK_ASS_16, DP_SINK_ASS_26, DP_HOT_PLUG6 and MHL_2_DETECT, from the adaptor board 101. Please note that only part of the main signals is depicted in FIG. 4 for illustrative purposes. The DP connector 401 provides the signal MHL_2_DETECT to the controller 124 of FIG. 1, wherein the value 1 of the MHL_2_DETECT represents the initial input signal S_IN is S_MHL; and the value 0 of the MHL_2_DETECT represents the initial input signal S_IN is S_HDMI.

Figure 5:
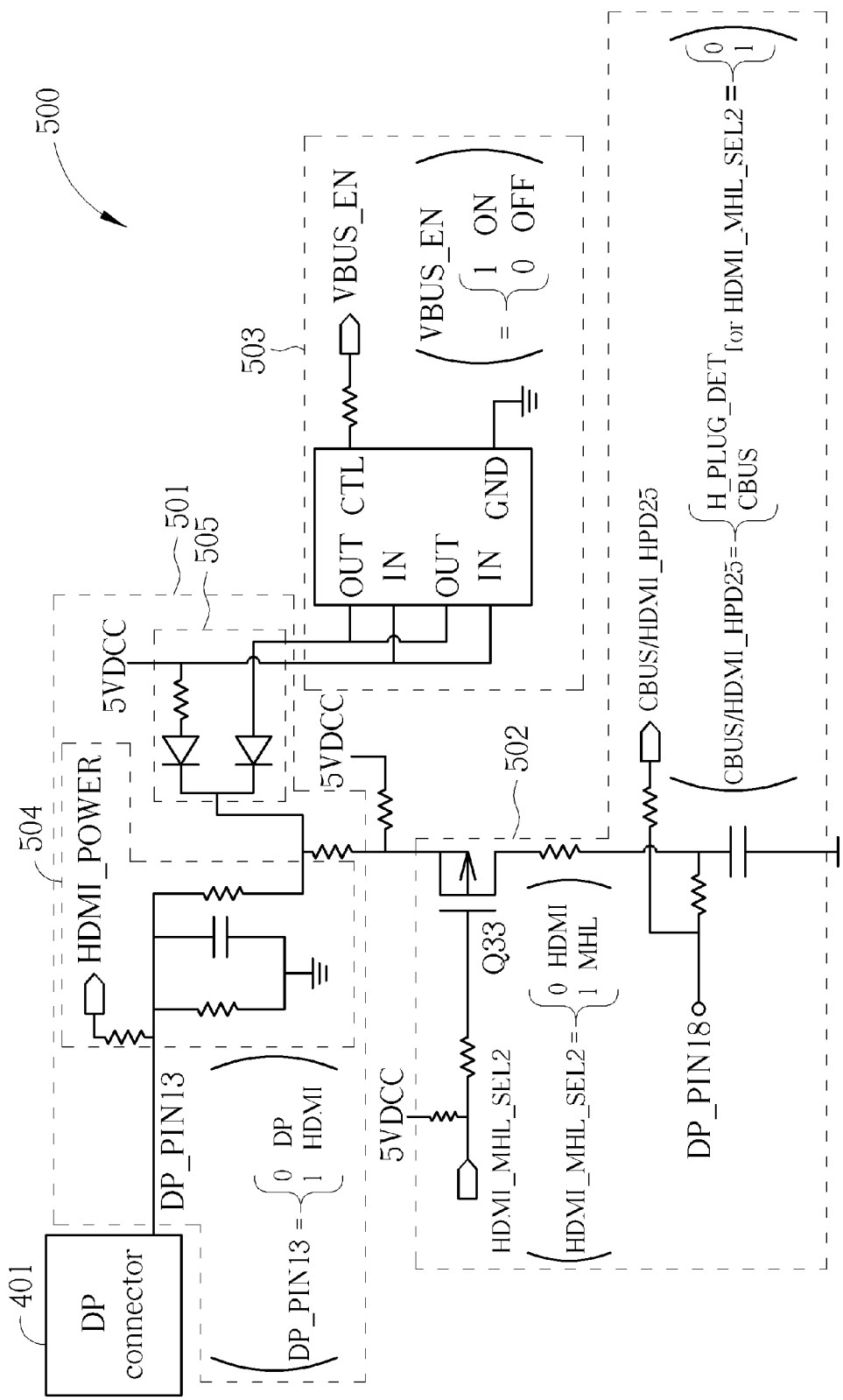
FIG. 5 is a circuit diagram illustrating the signal receiving circuit according to an embodiment of the present invention.

FIG. 5 is a circuit diagram illustrating the signal receiving circuit according to an embodiment of the present invention. Please refer to FIG. 5 in conjunction with FIG. 1. A signal receiving circuit 500 includes a controller 502, a switching circuit 501, a processing circuit 503 and the DP connector 401 of FIG. 4. The controller 502 is coupled to the DP connector 401. The switching circuit 501 is coupled to the controller 502. The processing circuit 503 is coupled to the switching circuit 501. The switching circuit 501 includes a first switch element 504 and a second switch element 505. In this embodiment, when the DP signal S_DP is input, the digital input signal S_Din is thus the normal DP signal, and all that is required is to correspondingly process the signal according to the DP specification, without any further detection and determination. When the digital input signal S_Din is the DP-like signal S_DP', it is necessary to detect which kind of signal the DP-like signal S_DP' is generated from. For instance, in the MHL signaling, the general purpose input (GPI) channel (MHL_2_DETECT of FIG. 5) is coupled to a 3.3 Ohm resistor whilst it is not in the HDMI signaling. The initial input signal can be determined to be the MHL signal if the voltage level of the GPI channel is high (MHL_2_DETECT=1); else, the initial input signal can be determined to be the HDMI signal if the voltage level of the GPI channel is low (MHL_2_DETECT=0). The controller 502 continues the subsequent process according to the determined result.

If the initial input signal is the MHL signal, the general purpose output (GPO) channel of the controller 502 of FIG. 5, i.e. the HDMI_MHL_SEL2, will be pulled up to turn on the second switch element 505 of the switching circuit 501, and turn off the first switch element 504 and the P-type metal-oxide-semiconductor field-effect transistor (MOSFET) Q33. The GPO (VBUS_EN) of the processing circuit 503 will be pulled up to provide +5V voltage to the MHL signal terminal for power charging. The channel CBUS/HDMI_HPD25 of the controller 502 will be switched from the H_PLUG_DET channel of the HDMI signal to CBUS to receive/transmit the CBUS signal, and in this case the switching circuit 501 is operative in the second connection configuration.

If the initial input signal is the HDMI signal, the GPO channel of the controller 502 of FIG. 5, i.e. the HDMI_MHL_SEL2, will be pulled down to turn on the first switch element 504 of the switching circuit 501, and turn on the second switch element 505 and the P-type MOSFET Q33. The GPO (VBUS_EN) of the processing circuit 503 will be pulled down and therefore not provide the +5V voltage. The channel CBUS/HDMI_HPD25 of the controller 502 will be switched from CBUS to H_PLUG-DET to perform plug detection, and in this case the switching circuit 501 is operative in the first connection configuration.

Figure 6:
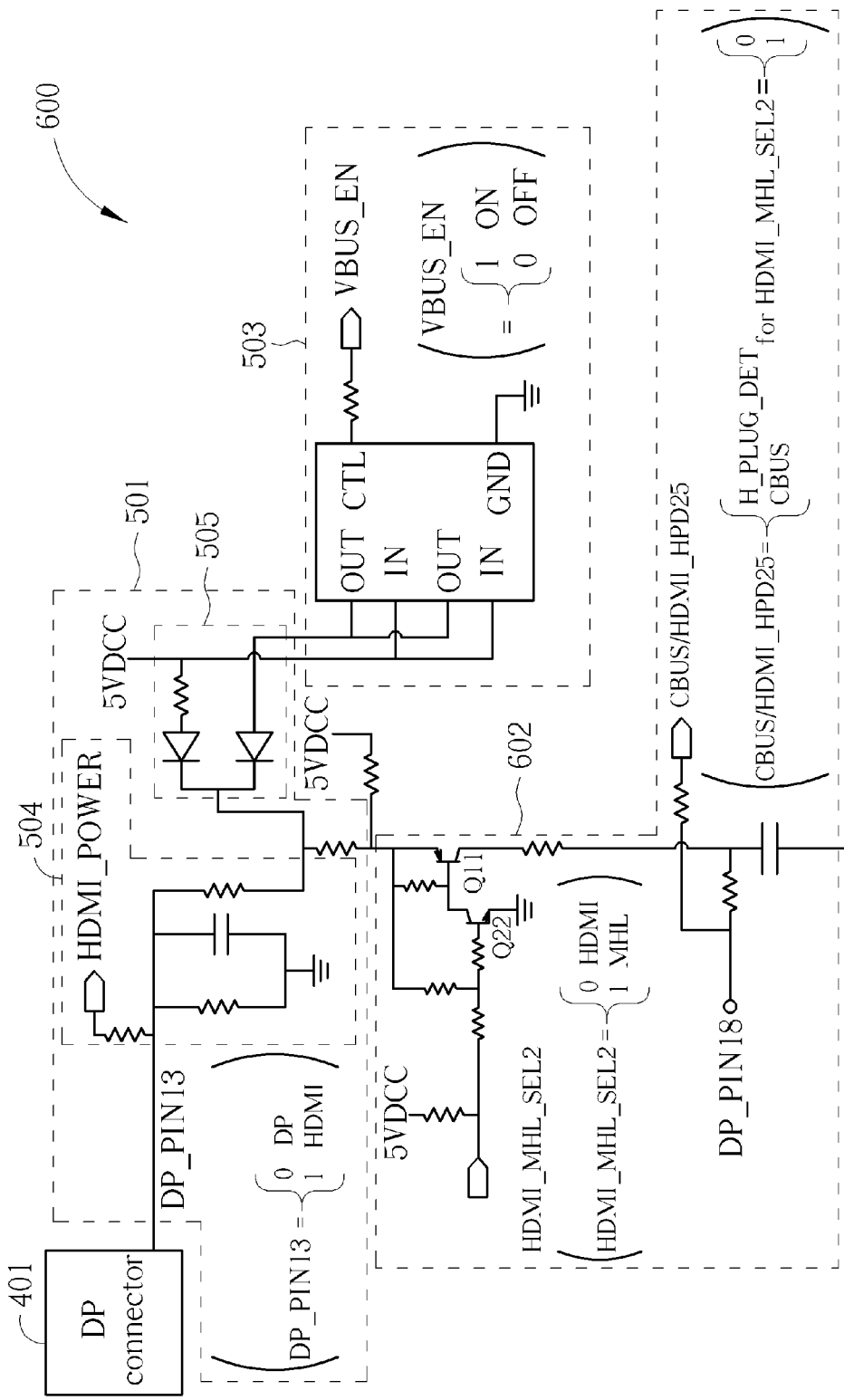
FIG. 6 is a circuit diagram illustrating the signal receiving circuit according to another embodiment of the present invention.

It should be noted that the invention is not limited to that illustrated in FIG. 5. FIG. 6 is a circuit diagram illustrating a signal receiving circuit 600 according to another embodiment of the present invention. The difference between the signal receiving circuit of FIG. 6 and the signal receiving circuit 500 of FIG. 5 is that a controller 602 of the signal receiving circuit 600 uses a PNP bipolar junction transistor (BJT) Q11 and an NPN BJT Q22 to replace the P-type MOSFET Q33 of the controller 501 of FIG. 5, thereby reducing the parasitic capacitance induced by the P-type MOSFET Q33 and shortening the rise time and the fall time of the CBUS.

Figure 7:
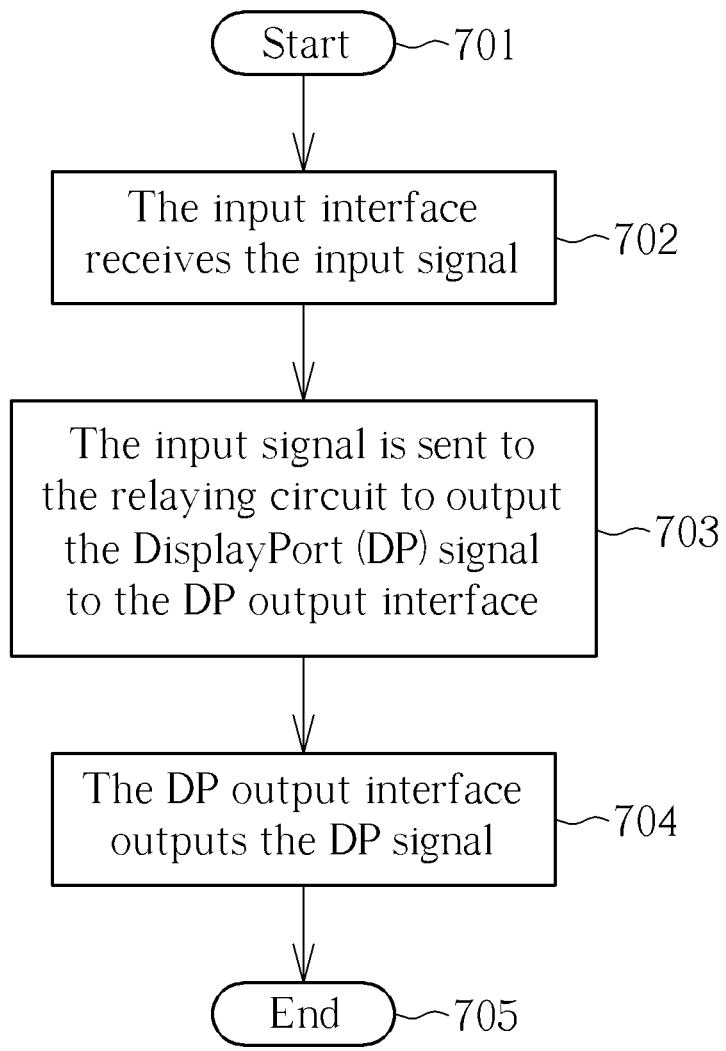
FIG. 7 is a flowchart illustrating a signal adapting method according to an embodiment of the present invention.

FIG. 7 is a flowchart illustrating a signal adapting method according to an embodiment of the present invention. Please refer to FIG. 7 in conjunction with FIG. 2. The signal adapting method starts at step 701, and the input interface 201 receives an input signal S_IN (e.g. the HDMI signal S_HDMI or the MHL signal S_MHL) in step 702. The input signal S_IN is then transmitted to the relaying circuit 202 to output the DP-like signal S_DP' to the DP output interface 203. The flow then goes to step 704, and the DP output interface 203 outputs the DP-like signal S_DP', wherein the input signal S_IN and the DP-like signal S_DP' correspond to different interface standards. The flow ends at step 705.

Figure 8:
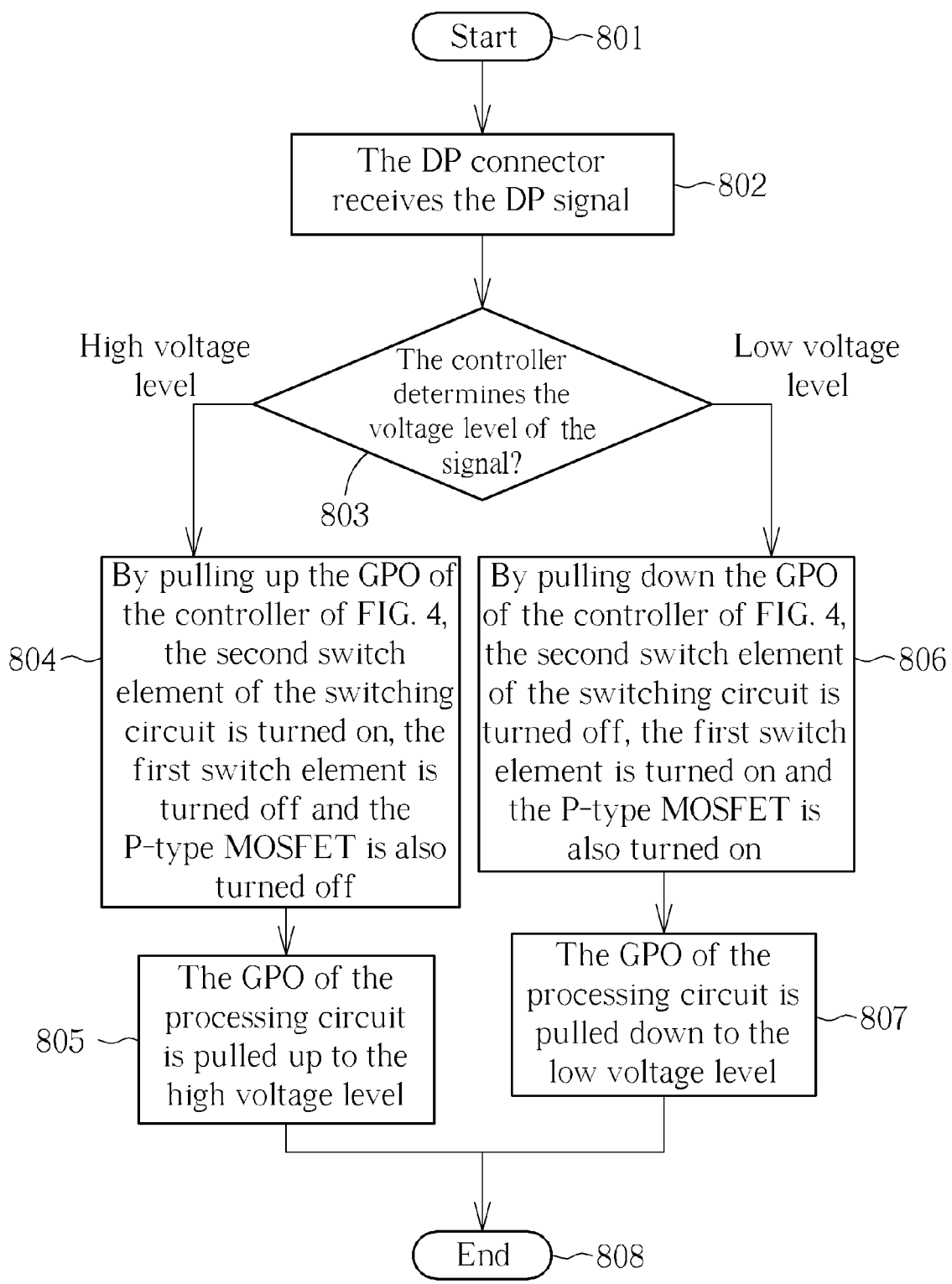
FIG. 8 is a flowchart illustrating a signal receiving method according to an embodiment of the present invention.

FIG. 8 is a flowchart illustrating a signal receiving method according to an embodiment of the present invention. Please refer to FIG. 8 in conjunction with FIGS. 4 and 5. The signal receiving method starts at step 801, and the DP connector 401 receives the DP signal S_DP', which includes at least the signal MHL_2_DETECT. In step 803, the controller 402 determines the voltage level of the signal MHL_2_DETECT. When the voltage level of the signal MHL_2_DETECT is high, the input signal will be regarded as the MHL signal and the flow will go to step 804. In step 804, by pulling up the GPO of the controller 402 of FIG. 5, i.e. pulling up the HDMI_MHL_SEL2, the second switch element 405 of the switching circuit 501 is turned on, the first switch element 404 is turned off and the P-type MOSFET Q33 is also turned off. In step 805, the GPO (VBUS_EN) of the processing circuit 403 is pulled up to provide +5V voltage to the MHL signal terminal for power charging. The flow ends at step 808.

When the voltage level of the MHL_2_DETECT is low, the input signal will be regarded as the HDMI signal and the flow will go to step 806. In step 806, by pulling down the GPO of the controller 402 of FIG. 5, i.e. pulling down the HDMI_MHL_SEL2, the second switch element 405 of the switching circuit 501 is turned off, the first switch element 404 is turned on and the P-type MOSFET Q33 is also turned on. In step 807, the GPO (VBUS_EN) of the processing circuit 403 is pulled down and therefore does not provide +5V voltage to the MHL signal terminal. The flow ends at step 808.

By integrating the HDMI and MHL interfaces to the DP interface as detailed in this invention, the hardware cost and complexity are reduced, and the user experience is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A signal adaptor, comprising:
an input interface, arranged to receive an input signal;
a DisplayPort (DP) output interface, arranged to output a DP-like signal; and
a relaying circuit, coupled between the input interface and the DP output interface, arranged to relay the input signal received by the input interface to the DP output interface according to characteristics of channels, in order to generate the DP-like signal;

wherein the input interface and the DP output interface correspond to different interface standards, and the DP-like signal indicates whether the input signal corresponds to the mobile high definition link (MHL) standard.

2. The signal adaptor of claim 1, wherein the DP-like signal further indicates whether the input signal corresponds to the high-definition multimedia interface (HDMI) specification.

3. A signal receiving circuit, comprising:
a DisplayPort (DP) connector, arranged to receive a first input signal or a second input signal, and generate a digital input signal accordingly;
a controller, coupled to the DP connector, arranged to detect the digital input signal so as to generate a control signal; and
a switching circuit, arranged to select a first connection configuration or a second connection configuration to act as a target connection configuration according to the control signal, and pass the digital output signal via the target connection configuration to produce an output signal;
wherein the first input signal complies with the DP format, and the second input signal is a DP-like signal generated by relaying an initial input signal complying with the HDMI specification or the MHL standard, and the second input signal indicates whether the initial input signal corresponds to the MHL standard.

4. The signal receiving circuit of claim 3, wherein the controller configures the control signal according to a voltage level corresponding to a specific pin of the digital input signal, to control the switching circuit to employ the first/second connection configuration to be the target connection configuration.

5. The signal receiving circuit of claim 3, wherein the first connection configuration and the second connection configuration correspond to the HDMI specification and the MHL standard, respectively.

6. The signal receiving circuit of claim 3, wherein the switching circuit comprises:
a first switching element; and
a second switching element, arranged to control whether to utilize an internal supply voltage of the signal receiving circuit to act as a power signal of the output signal;
wherein when the target connection configuration is the first connection configuration, the first switching element is turned on and the second switching element is turned off, so that a signal of the DP-like signal is employed as an HDMI power signal; and when the target connection configuration is the second connection configuration, the second switching element is turned on and the first switching element is turned off, so that the supply voltage of the signal receiving circuit is output as an MHL voltage bus signal.

7. The signal receiving circuit of claim 4, further comprising:
a processing circuit, arranged to process the output signal generated by the switching circuit;
wherein the controller further outputs the control signal to the processing circuit;
when the target connection configuration is the first connection configuration, the processing circuit regards a signal of the output signal corresponding to another specific pin of the DP port as an HDMI hot plug detect signal; and when the target connection configuration is the second connection configuration, the processing circuit regards the signal of the output signal corresponding to another specific pin of the DP port as an MHL control bus signal.

8. The signal receiving circuit of claim 4, further comprising:
a signal adaptor, comprising:
an input interface, arranged to receive the initial input signal;
a DisplayPort (DP) output interface, arranged to output the DP-like signal, the input interface and the DP output interface corresponding to different respective interface standards; and
a relaying circuit, coupled between the input interface and the DP output interface, arranged to relay the initial input signal to the DP output interface according to characteristics of channels, so as to generate the DP-like signal;
wherein when the initial input signal complies with the DP format, the initial input signal is input to the DP connector directly to act as the first input signal;
when the initial input signal complies with the HDMI specification or the MHL standard, the initial input signal is provided to the DP connector via the signal adaptor.

9. A signal adapting method, comprising:
receiving an input signal;
relaying the received input signal to a DP output interface according to characteristics of channels; and
outputting a DP-like signal by the DP output interface;
wherein the input interface and the DP output interface correspond to different respective interface standards, and the DP-like signal indicates whether the input signal corresponds to the mobile high definition link (MHL) standard.

10. The signal adapting method of claim 9, wherein the DP-like signal further indicates whether the input signal complies with the high-definition multimedia interface (HDMI) specification.

11. A signal receiving method, comprising:
receiving a first input signal or a second input signal, and generating a digital input signal accordingly;
detecting the digital input signal to generate a control signal; and
selecting a first connection configuration or a second connection configuration to act as a target connection configuration according to the control signal, and passing the digital output signal via the target connection configuration to produce an output signal;
wherein the first input signal complies with the DP format, and the second input signal is a DP-like signal generated by relaying an initial input signal complying with the HDMI specification or the MHL standard, and the second input signal indicates whether the initial input signal corresponds to the MHL standard.

12. The signal receiving method claim 11, wherein the step of detecting the digital input signal to generate the control signal comprises:
configuring the control signal according to a voltage level corresponding to a specific pin of the digital input signal.

13. The signal receiving method of claim 12, wherein the first connection configuration and the second connection configuration correspond to the HDMI specification and the MHL standard, respectively.

14. The signal receiving method of claim 12, wherein the step of selecting the first/second connection configuration to act as the target connection configuration according to the control signal comprises:
  when the first connection configuration is selected by the control signal to act as the target connection configuration, a first switching element is turned on and a second switching element is turned off, so that a signal of the DP-like signal is employed as an HDMI power signal, wherein the second switching element is arranged to control whether to utilize an internal supply voltage to act as a power signal of the output signal; and
  when the second connection configuration is selected by the control signal to act as the target connection configuration, the second switching element is turned on and the first switching element is turned off, so that the supply voltage is output as an MHL voltage bus signal.

15. The signal receiving method of claim 12, further comprising:
  when the first connection configuration is selected by the control signal to act as the target connection configuration, a signal of the output signal corresponding to another specific pin of the DP port is regarded as an HDMI hot plug detect signal; and
  when the second connection configuration is selected by the control signal to act as the target connection configuration, the signal of the output signal corresponding to another specific pin of the DP port is regarded as an MHL control bus signal.

* * * * *